March 29, 1966  T. A. RATKOWSKI  3,243,035
CONVEYOR

Filed Sept. 27, 1963  3 Sheets-Sheet 1

Inventor
Thomas A. Ratkowski
By Wallace, Kinzer and Dorn
Attorneys

March 29, 1966 T. A. RATKOWSKI 3,243,035
CONVEYOR
Filed Sept. 27, 1963 3 Sheets-Sheet 2
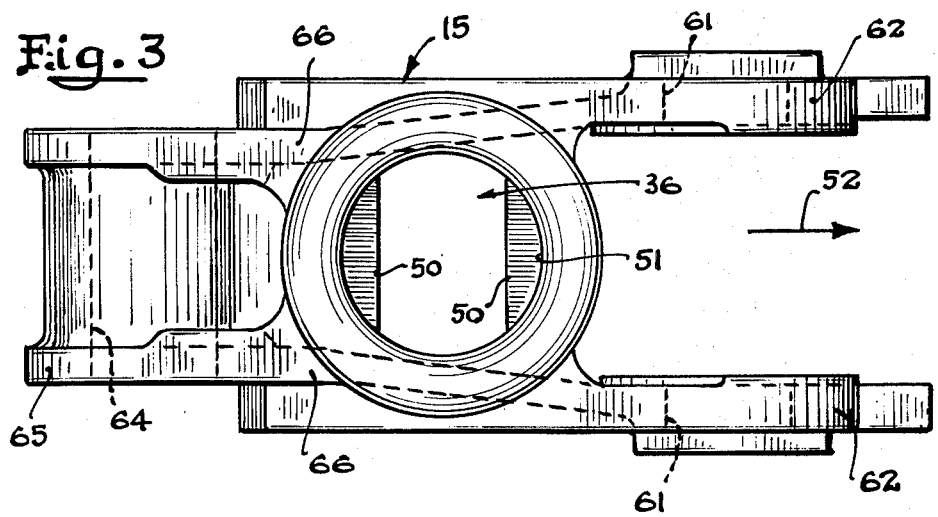
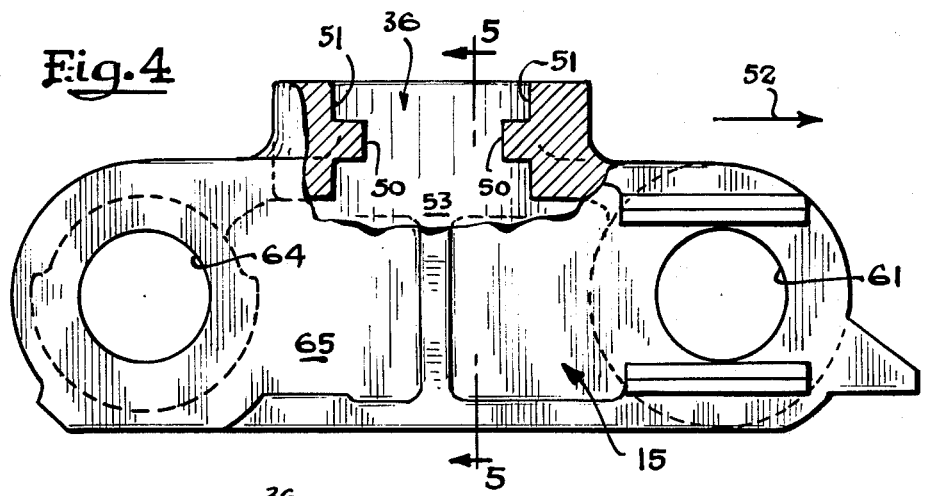
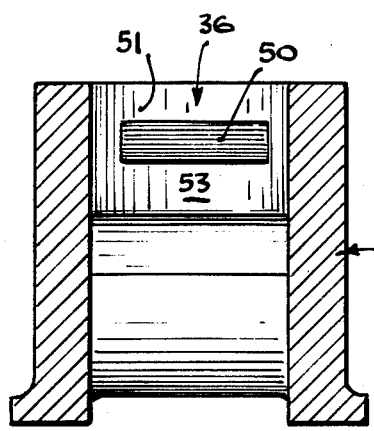
Inventor
Thomas A. Ratkowski
By Wallace, Kinzer and Dorn
Attorneys

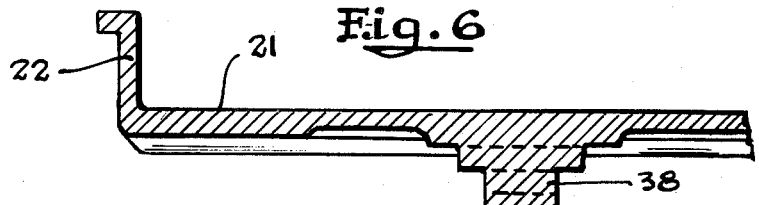
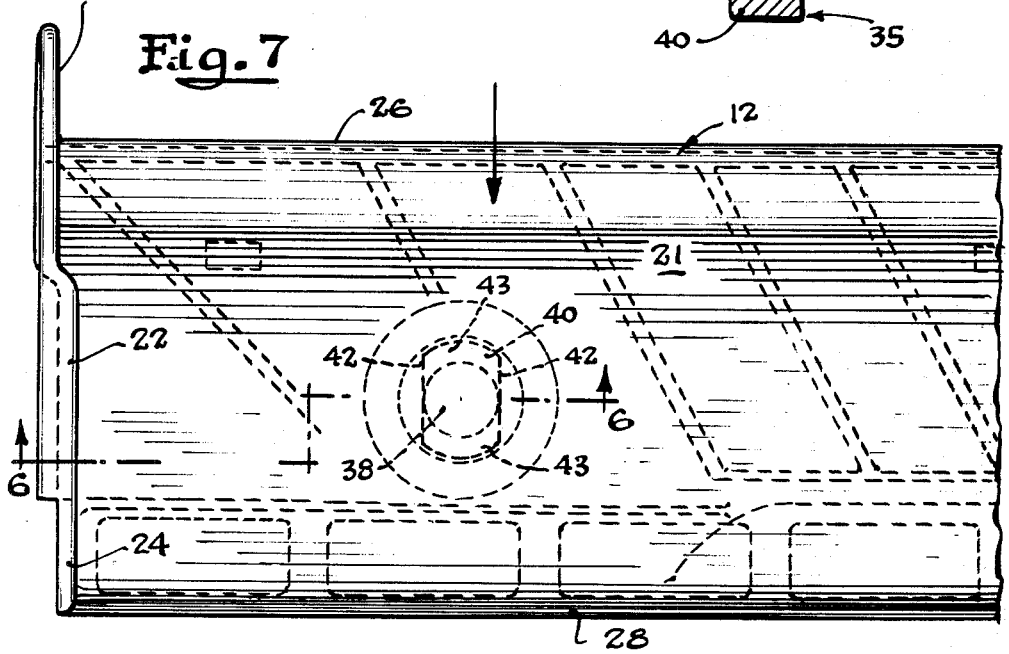
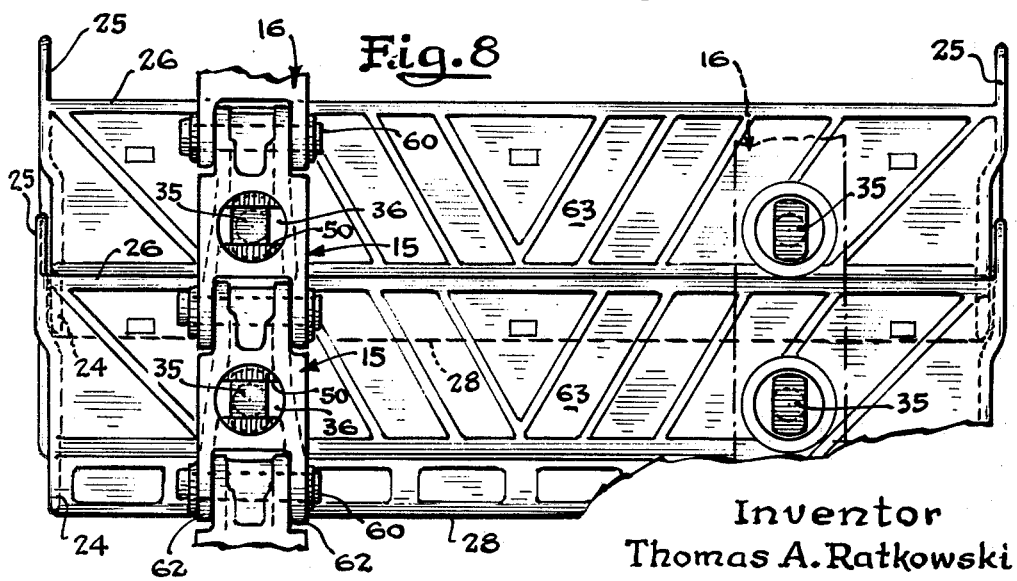

United States Patent Office

3,243,035
Patented Mar. 29, 1966

3,243,035
CONVEYOR
Thomas A. Ratkowski, Chicago Heights, Ill., assignor to American Brake Shoe Company, Wilmington, Del., a corporation of Delaware
Filed Sept. 27, 1963, Ser. No. 312,176
10 Claims. (Cl. 198—196)

This invention relates to conveyors, and more particularly to the manner of attaching conveyor pans or platforms to a driving mechanism therefor.

In a common form of conveyor having conveyor pans or aprons for transporting material, the conveyor pans are carried by two spaced driving chains to which the conveyor pans are attached by rivets or bolts. The conveyor pans or aprons are subjected to heavy loads and vibrations and hence must be ruggedly constructed to withstand the vibrations as well as loading and unloading of the heavy loads of material placed thereon. Because of such severe working conditions, the rivets or bolts securing the conveyor pan to the driving links may loosen or be lost with a consequent loss of the efficiency of the conveyor that often necessitates a shutdown of the conveyor to replace a lost or loose bolt. Experience has shown that during the life of a conveyor pan its attaching rivets or bolts need to be replaced two or three times. Additionally, periodic maintenance of the conveyor is necessitated to tighten or replace loose bolts or rivets.

Accordingly, an object of the present invention is to eliminate rivets or bolt-type fasteners between such a conveyor pan and a driving mechanism, and to secure together the conveyor pan and driving mechanism by interlocking elements on the conveyor pan and driving mechanism.

A more specific object of the present invention is to secure a conveyor pan to the supporting links of a pair of driving chains by lug and socket arrangements which are interlocked when the lugs and sockets are oriented in the direction of travel of the conveyor, and which are unlocked when the conveyor pan and links are rotated relative to one another, to another position.

Under the present invention, and in accordance with another object of the present invention, the links of the conveyor chains are attachable to their associated conveyor pans when oriented at 90° to the direction of conveyor travel, and are interlocked with the conveyor pan when rotated to the direction of conveyor travel. The links of the conveying chain are connected to adjoining link which prevent the turning of any given link to an unlocking position so long as the chain is complete, thereby locking the conveyor pans to the conveyor links during normal conveying operations.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 3 is a plan view of a driving link;

FIG. 4 is an elevational view of a driving link;

FIG. 5 is a sectional view taken along the line 5—5 in FIG. 4 in the direction of the arrows showing a receiving socket in the driving link;

FIG. 6 is a sectional view taken along the line 6—6 in FIG. 7 showing the conveyor pan;

FIG. 7 is an enlarged plan view of one half of a conveyor pan; and

FIG. 8 is a bottom view showing a pair of conveyor pans connected to driving chains.

Figure 1:
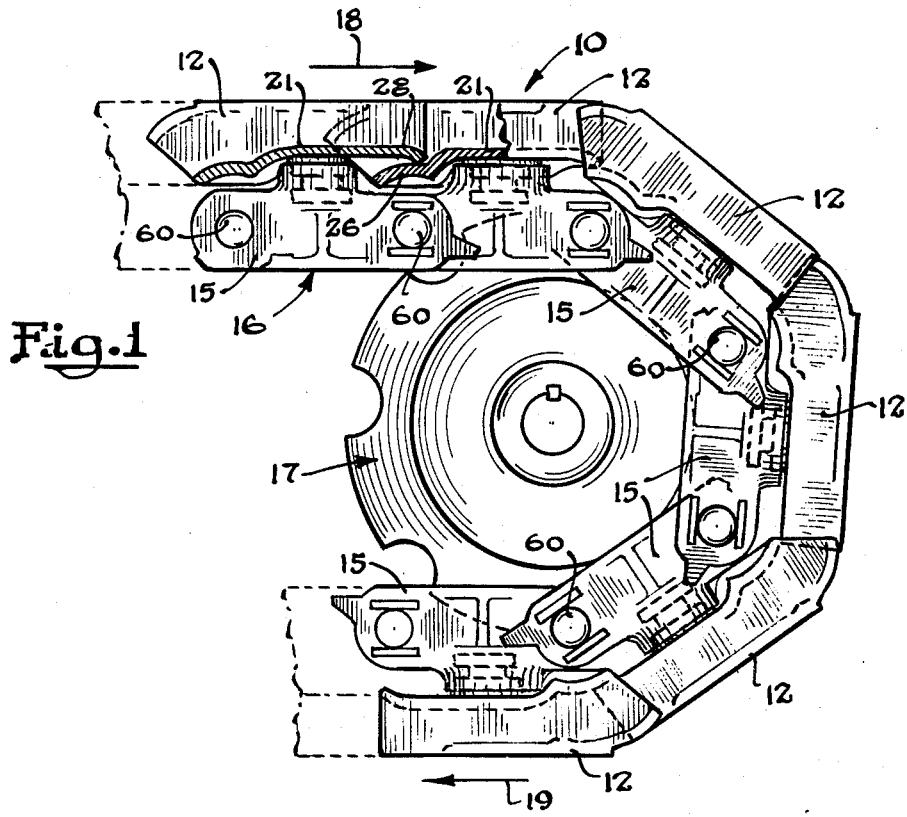
FIG. 1 is an elevational view of an endless conveyor embodying the present invention.

Referring now to the drawings, and more particularly to FIG. 1, there is shown a conveyor 10 with a series of overlapping conveyor pans 12 carried by a series of connected links 15 which form a conveyor chain 16 adapted to be driven by a driving sprocket 17, this being the general conveyor construction shown in Patent No. 1,565,760 granted December 15, 1925. The conveyor 10, in which the present invention is embodied, is merely illustrative of a conventional endless conveyor in which the present invention can be employed, and the present invention is not to be construed as limited to only endless conveyors or the particular conveyor described hereinafter.

The endless conveyor shown in FIG. 1 has a top run moving in the direction of the arrow 18, and about the driving sprocket 17 to a lower run 19 moving in the return direction. The conevyor pans or aprons 12 can be loaded with material while the pans 12 are moving along the upper run. As the pans 12 rotate about the driving sprocket 17, the pans 12 discharge the material thereon and being their return travel along the lower run.

The conveyor pans or aprons 12 have a flat floor 21, FIG. 7, which is rectangular in shape with the longer dimension extending transverse to the pair of driving chains 16, FIG. 8. Integrally formed with the floor 21 and rising therefrom on opposite sides are a pair of spaced side flanges 22 which serve to contain the material on the floor 21. As will be apparent from FIGS. 7 and 8, these side flanges 22 have inwardly positioned, forward portions 24 offset inwardly from rearward portions 25 which extend rearwardly of the rear portion or edge 26 of the floor 21. When the conveyor pans 12 are secured to the driving chains 16, each of the forward, inwardly directed portions 24 of the side flanges 22 is positioned adjacent the rearwardly extending portion 25 of a preceding pan 12. Thus, the flanges 22 constitute continuous side walls for holding material on the conveyor.

Figure 2:
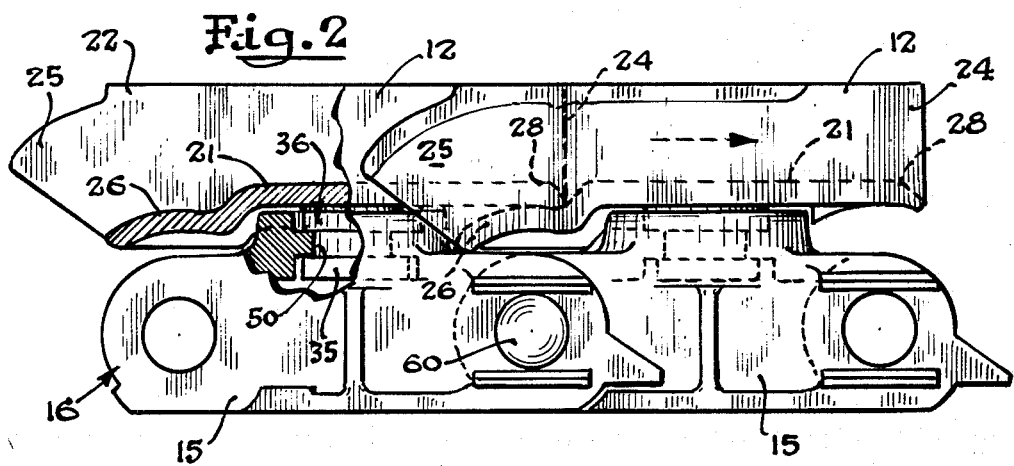
FIG. 2 is an elevational view of a pair of conveyor pans connected to their resepctive driving links in the manner of the present invention.

For the purpose of preventing material from falling between adjacent pans 12, the rearward portions 26 of each of the pans 12 is offset downwardly, FIG. 2, from the plane of floor 21 of its pan 12 and is arcuately curved to fit under the overlying and leading end portion 28, FIG. 2, of the adjacent floor 21 of the preceding conveyor pan 12. Thus, as seen in FIG. 1, the material being carried by the pan is prevented from moving downwardly between adjacent pans 12, even when the pans are being tilted about the driving sprocket 17.

In accordance with the present invention, the novel manner of attaching the conveyor pans 12 to the driving chain 16 includes integrally-formed, downwardly extending lugs or projections 35, FIG. 6, on the pans 12 adapted to be received in receiving openings or sockets 36, FIGS. 3 and 4, in a link 15. Each pan 12 has a pair of spaced lugs 35, FIG. 8, and a pair of supporting links 15 therefor. When a projecting lug 35 and receiving socket 36 are oriented in the direction of conveyor travel, the projecting lug 35 is interlocked with the supporting link 12, the lug 35 and receiving socket 36 being of the bayonet type of interlock, as will hereinafter be explained. That is, the lug 35 has a central cylinder portion 38 of a given diameter leading to an end portion 40 having opposed projections 43 extending outwardly in oposite directions from the cylindrical portion 38. The projections 43 have outer curved cylindrical surfaces leading to opposed flat sides 42, which sides 42 are parallel to one another, FIG. 7. The flat sides 42, also, are tangential to the cylindrical portion 38.

The receiving sockets 36 in the links 15 have inwardly directed shoulders or projections 50, FIGS. 3 and 4, on opposed side walls 51. The shoulders 50 extend transversely across the link 15, and transversely to the direction of movement of a link which would be in the direction of arrows 52, FIGS. 3 and 4. The socket 36 at the projections 50 is an elongated opening with curved end walls that are complementally shaped to the bottom portion 40 of the lugs 35, that is, when the lug 35 is aligned to have the flats 42 parallel to sides 52 of the projections 50.

When interconnecting a conveyor pan 12 with an associated pair of spaced supporting links 15, the links 15 are rotated at 90° from the position shown in FIG. 8 at which position the links 15 are aligned in the direction of conveyor travel. Stated differently, when a link 15 is being connected or disconnected, the link 15 is turned to extend with its forward arms 62, FIGS. 3 and 4, directed parallel to the longer side of the pan 12. In this position, the link 15 is moved vertically upward relative to the bottom surface 63, FIG. 8, of the pan 12 so that the end portion 40 of the lug 35 on the pan 12 passes between the inwardly directed shoulders 50 into the circular cavity 53, FIGS. 4 and 5, therebeneath. Thereupon, rotation of the link 15 positions the outwardly extending projections 43 of the lug 35 under the inwardly directed shoulders 50 of the socket 36. Thus positioned, the projections 43 underlying the inwardly projecting shoulders 50 constitute interlocking elements or means preventing separation of the pan 12 from the link 15.

Adjacent links 15 are joined together by suitable pins 60, FIG. 1, extending through transversely aligned openings 61 in the forward arms 62 of a link 15, and through a bore 64 in the integral barrel 65 of the preceding link 15, FIGS. 3 and 4. Extending forwardly from the barrel 65, the links 15 have side walls 66 that diverge outwardly to the spaced arms 62 at the forward end of a link 15. With the barrel 65 of a preceding link inserted in the space between the arms 62 of a succeeding link 15 and with a pin 60 extending through the transverse openings 61, and bore 64, the links 15 are joined together so as to be pivotal about the pin 60 in an oscillatory manner, but are restricted from turning sideways, that is, sideways or normal to the direction of travel of the conveyor. In this manner, the links 15 are prevented from turning to a release or unlocking position where the portions 43 of the lug 35 would be able to move vertically past the inwardly directed shoulders 50 so as to separate a link 15 from the pan 12. Conversely, to detach a pan 12 and link 15, the pins 60 must be removed so the link 15 can be turned normal to the direction of conveyor travel.

From the foregoing, it should be apparent that the conveyor pans or aprons 12 are readily secured to the links 15 of a driving chain 16 by interlocking members on the pans and links. It should be noted that an interlocking lug could be positioned on the link 15 and the receiving opening or socket therefor could be provided on the pan 12, and still be within the purview of the present invention.

Hence, while I have illustrated and described preferred embodiments of the invention, it is to be understood that these are capable of variation and modification, and I, therefore, do not wish to be limited to the precise details set forth, but desire to avail myself of such changes and alterations as fall within the purview of the following claims.

I claim:

1. In a conveyor, a plurality of material receiving means for receiving material and conveying the material; driving means including a plurality of elements adapted to be secured together and adapted to support a plurality of said material receiving means, said driving means adapted to move said material receiving means along a path of travel; interlocking means on said material receiving means for securing said material receiving means to said driving means; and interlocking means on said driving means for interlocking with said interlocking means on said material receiving means when said driving means and material receiving means are oriented in the direction of conveyor travel, said interlocking means on said material receiving means and said driving means being unlocked when turned relative to one another.

2. In a conveyor, a plurality of material conveyor pans for receiving and conveying material deposited thereon; a plurality of link elements secured together to form a conveyor chain and adapted to support a plurality of conveyor pans and to move said conveyor pans along a conveying path of travel; and interlocking means for securing said conveyor pans to said links, said interlocking means including a projecting lug and a receiving socket adapted to receive said projecting lug when oriented in one position, whereby when rotated to another position said projecting lug is locked against removal from said socket.

3. In a conveyor, a plurality of material conveyor pans for receiving and conveying material deposited thereon; a plurality of link elements secured together to form a conveyor chain and adapted to support a plurality of conveyor pans and to move said conveyor pans along a conveying path of travel; means on said link elements having an opening leading to an interior cavity of larger size; and lug means on said conveyor pans having an end portion with a dimension larger in one direction than in another direction, said end portion being adapted to be inserted through said opening in said link and turned within said enlarged cavity to be disposed against removal through said opening while being oriented in the direction of conveyor travel.

4. In a conveyor, a plurality of material conveyor pans for receiving and conveying material being deposited thereon; a plurality of link elements secured together to form a conveyor chain and adapted to support a plurality of conveyor pans and to move conveyor pans along a conveyor path of travel; interlocking means on said links and said conveyor pans including a lug adapted to be received in a socket, said lug having an end portion including a cylindrical portion having opposed and spaced projections thereon, said socket having a complementary shaped opening therein through which said lug may be projected when link is normal to the direction of conveyor travel, said projections on said lugs being disposed against movement through said opening when said links and conveyor pans are aligned in the direction of conveyor travel.

5. In a conveyor, a plurality of material conveyor pans for receiving and conveying material being deposited thereon; a plurality of link elements secured together to form a conveyor chain and adapted to support a plurality of conveyor pans and to move said conveyor pans along a conveying path of travel; interlocking means on said conveyor pans and said link elements for securing said conveyor pans to said links, said interlocking means including a projecting lug, a receiving socket for said lug when said receiving socket is oriented in one position, rotation of said socket and lug relative to one another causing said projecting lug to be locked against removal from said socket; securing means for securing together said links to form a chain whereby said links may pivot about said pin means in the direction of conveyor travel and whereby said links are prevented from turning normal to the direction of conveyor travel.

6. In a conveyor having a plurality of material conveying pans supported on a pair of spaced driving chains having a plurality of link elements, socket means in the link elements of said opposed chains; spaced projecting lugs on each of said conveying pans projecting downwardly into said receiving sockets on supporting links beneath said conveyor pans; said projecting lugs having an end portion with opposed and spaced projections thereon facing in the direction of conveyor travel; said socket having an elongated opening extending transversely of said link, said elongated opening leading downwardly to an enlarged cavity capable of receiving said projections on said lug when said projections are facing in the direction of conveyor travel; said projections on said lugs being held against movement through said elongated opening while said links and conveyor pans are aligned in the direction of conveyor travel; and means on said chains for holding said links against sideway rotation to align said elongated opening with said spaced projections on said lug, whereby said link and conveyor pan may be detached from one another.

7. A conveyor pan or the like for receiving material to be deposited thereon, said conveyor pan having a bottom supporting surface on which the material is to be deposited and supported, opposed upstanding side walls extending upwardly from said bottom supporting surface to contain the material to be deposited on said bottom supporting surface; and interlocking means on the underside of said bottom surface for interconnecting with a driving means for the conveyor when said pan is oriented in the direction of conveyor travel.

8. The conveyor pan of claim 7 wherein said interconnecting means is a depending lug having an end portion with a dimension larger in one direction than in another direction, said end portion being adapted to be inserted through an opening in the driving means for said pan and said end portion adapted to be disposed against removal through said opening in said driving means while said pin is oriented in the direction of conveyor travel.

9. A conveyor element for conveying material deposited thereon, said conveyor element having a supporting surface on which material is adapted to be deposited, and at least two, integrally formed projecting lugs on said conveyor element, each of said projecting lugs having a generally cylindrical body portion, said cylindrical body portions having opposed projections extending therefrom for interlocking engagement with a socket on a conveyor.

10. In a conveyor, a plurality of material receiving means for supporting and conveying material deposited thereon, driving chains each having a plurality of link elements, pin means interlocking said link elements to form said driving chains, each of said link elements having spaced pin receiving means for receiving a pin to interlock said link elements, spaced side walls on each of said link elements, each of said link elements having means forming a socket cavity intermediate said spaced side walls and said pin receiving means, spaced projecting lugs on each of said material receiving means and projecting downwardly into said socket cavities on said supporting links, said projecting lugs having spaced projections thereon which when oriented in a first direction are insertable into said socket cavity and which upon being turned are interlocked within said socket cavity.

References Cited by the Examiner
UNITED STATES PATENTS

| | | | |
|---|---|---|---|
| 362,716 | 5/1887 | Broughton | 24—221 |
| 810,537 | 1/1906 | Hopkins | 24—221 |
| 1,715,094 | 5/1929 | Meekins | 198—189 X |
| 2,021,748 | 11/1935 | Schaefer | 198—189 |
| 2,524,186 | 10/1950 | Beninger | 198—195 |
| 2,955,700 | 10/1960 | Badger | 198—189 |

EVON C. BLUNK, *Primary Examiner*.

WILLIAM B. LABORDE, SAMUEL F. COLEMAN, *Examiners*.

R. E. AEGERTER, *Assistant Examiner*.